US009380525B2

(12) United States Patent
Kanamarlapudi et al.

(10) Patent No.: US 9,380,525 B2
(45) Date of Patent: Jun. 28, 2016

(54) DEVICES AND METHODS FOR FACILITATING OPTIMIZED TUNE-AWAY OPERATIONS IN MULTI-SUBSCRIPTION COMMUNICATION DEVICES

(71) Applicant: QUALCOMM Incorporated, San Diego, CA (US)

(72) Inventors: Sitaramanjaneyulu Kanamarlapudi, San Diego, CA (US); Chetan Gopalakrishnan Chakravarthy, San Diego, CA (US); Arvindhan Kumar, San Diego, CA (US); Aravindh Suriyamoorthy, Hyderabad (IN); Pavankumar Gabbita, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 54 days.

(21) Appl. No.: 14/470,859

(22) Filed: Aug. 27, 2014

(65) Prior Publication Data
US 2015/0215859 A1 Jul. 30, 2015

Related U.S. Application Data

(60) Provisional application No. 61/933,444, filed on Jan. 30, 2014.

(51) Int. Cl.
*H04W 48/18* (2009.01)
*H04W 76/04* (2009.01)
(Continued)

(52) U.S. Cl.
CPC .......... *H04W 48/18* (2013.01); *H04W 72/1284* (2013.01); *H04W 76/045* (2013.01); *H04W 8/18* (2013.01); *H04W 72/1215* (2013.01); *H04W 76/025* (2013.01); *H04W 88/06* (2013.01)

(58) Field of Classification Search
CPC ..... H04W 48/18; H04W 48/20; H04W 48/17; H04W 48/16; H04W 48/00; H04W 48/02; H04W 48/06; H04W 48/08; H04W 48/10; H04W 48/12
USPC .................................................. 455/405, 418
See application file for complete search history.

(56) References Cited

U.S. PATENT DOCUMENTS

2013/0150036 A1\* 6/2013 Pattaswamy et al. ...... 455/435.1
2013/0286853 A1\* 10/2013 Shi et al. ....................... 370/242
(Continued)

FOREIGN PATENT DOCUMENTS

EP 2605561 A1 6/2013
WO WO-2014000650 A1 1/2014

OTHER PUBLICATIONS

International Search Report and Written Opinion—PCT/US2015/013129—ISA/EPO—Apr. 2, 2015.
(Continued)

*Primary Examiner* — Siu Lee
(74) *Attorney, Agent, or Firm* — Loza & Loza LLP

(57) ABSTRACT

Access terminals are adapted to facilitate optimized tune-away operations in multi-subscription wireless communication devices. According to one example, an access terminal can communicate on a first subscription. After a period of time, the access terminal can tune away from the first subscription to a second subscription to perform a communication activity corresponding to the second subscription. After tuning back to the first subscription, the access terminal may transmit uplink data while ignoring any absolute grant received after tuning back to the first subscription, and/or transmit a scheduling information message in response to tuning back to the first subscription from the second subscription. Other aspects, embodiments, and features are also included.

26 Claims, 8 Drawing Sheets

(51) Int. Cl.
*H04W 88/06* (2009.01)
*H04W 8/18* (2009.01)
*H04W 76/02* (2009.01)
*H04W 72/12* (2009.01)

(56) References Cited

U.S. PATENT DOCUMENTS

| | | |
|---|---|---|
| 2013/0303181 A1 | 11/2013 | Rajurkar et al. |
| 2013/0303240 A1* | 11/2013 | Sanka et al. .................. 455/558 |
| 2014/0004842 A1 | 1/2014 | Lindoff et al. |
| 2014/0079038 A1 | 3/2014 | Maeda et al. |
| 2014/0086154 A1 | 3/2014 | Sajadieh |
| 2014/0119293 A1 | 5/2014 | Sikri et al. |
| 2014/0120925 A1 | 5/2014 | Kanthala et al. |

OTHER PUBLICATIONS

"Universal Mobile Telecommunications System (UMTS); Medium Access Control (MAC) protocol specification (3GPP TS 25.321 version 11.4.0 Release 11)", Technical Specification, European Telecommunications Standards Institute (ETSI), 650, Route Des Lucioles; F-06921 Sophia-Antipolis; France, vol. 3GPP RAN 2, No. V11.4.0, Jul. 1, 2013, XP014157083.

* cited by examiner

DEVICES AND METHODS FOR FACILITATING OPTIMIZED TUNE-AWAY OPERATIONS IN MULTI-SUBSCRIPTION COMMUNICATION DEVICES

PRIORITY CLAIM

The present Application for Patent claims priority to Provisional Application No. 61/933,444 entitled "Apparatus and Method For Transmission of System Information After a Tune Away in a Multi-SIM Communication Device" filed Jan. 30, 2014, and assigned to the assignee hereof and hereby expressly incorporated by reference herein.

TECHNICAL FIELD

The technology discussed below relates generally to wireless communications, and more specifically to methods and devices for facilitating optimized tune-away operations in multi-subscription wireless communication devices.

BACKGROUND

Wireless communication systems are widely deployed to provide various communication services such as telephony, video, data, messaging, broadcasts, and so on. Wireless communications networks, which are usually multiple access networks, support communications for multiple users by sharing the available network resources. Examples of such networks include networks based on the Global System for Mobile Communications (GSM), the Universal Mobile Telecommunications System (UMTS), and Long Term Evolution (LTE), which are defined by the 3rd Generation Partnership Project (3GPP), as well as cdma2000 1× and 1×EV-DO, which are defined by the 3rd Generation Partnership Project 2 (3GPP2), among others.

Wireless communication systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems. Multiple types of devices are adapted to utilize such wireless communications systems. Such devices may be generally referred to as access terminals.

A service provider (or network operator) may deploy multiple radio access technologies in a given wireless communication system to enable users of differently capable access terminals to access the service provider's system. For example, a service provider may deploy radio access technologies such as an LTE (eUTRA) network, an Evolution-Data Optimized cdma2000 (1×EV-DO) network (as defined by the 3GPP2 standards body), a cdma2000 1× network (also defined by 3GPP2), a UMTS network utilizing a Time Division Synchronous Code Division Multiple Access (TD-SCDMA) air interface or a wideband CDMA (W-CDMA) air interface, a network such as GSM, or any other suitable network.

In some instances, access terminals may be capable of communicating on two or more different radio access technologies. Such access terminals are often referred to as hybrid devices or hybrid access terminals. One common hybrid access terminal is a single-SIM device that may be referred to as a 1×/DO hybrid access terminal, which is capable of communicating on both 1×EV-DO networks and on cdma2000 1× networks. Another example of a hybrid access terminal is a dual- or multi-SIM device, which may be capable of communicating on any two or more different networks corresponding to two or more respective user subscriptions. That is, certain wireless networks identify subscribed users by means of a subscriber identity module (SIM).

Some wireless devices support multiple concurrently installed SIMs and may provide functionality corresponding to two or more SIMs utilizing a single communication interface or transceiver. For example, some access terminals support dual-SIM dual-standby (DSDS) functionality, wherein standby functions, such as performing idle mode procedures like receiving and responding to page messages, may be performed on two subscriptions on different radio access technologies (RATs) utilizing a single communication interface. Further, such DSDS technologies are frequently able to support active communication channels on one RAT while enabling tune-away operations to perform idle mode procedures on the other RAT, again, sharing a single communication interface. The two concurrent subscriptions may include some combination of circuit-switched (CS) and packet-switched (PS) traffic.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate tune-away operations in access terminals employing multiple subscriptions. According to at least one aspect of the disclosure, an access terminal may include a communications interface and a plurality of subscription modules. The plurality of subscription modules may include a first subscription module associated with a first subscription, and a second subscription module associated with a second subscription. The communications interface and the plurality of subscription modules may be operatively coupled with a processing circuit. The processing circuit may be adapted to communicate on the first subscription via the communications interface. The processing circuit may tune the communications interface away from the first subscription to the second subscription for performing a communication activity corresponding to the second subscription. The processing circuit can then tune the communications interface back to the first subscription and receive a transmission associated with the first subscription via the communications interface after tuning back to the first subscription, where the transmission includes an absolute grant. The processing circuit can subsequently transmit uplink data via the communications interface while ignoring the received absolute grant.

Additional aspects of the present disclosure include methods operational on an access terminal and/or means for performing such methods. According to at least one example, such methods may include tuning away from a first subscription to a second subscription to perform a communication activity corresponding to the second subscription. After tuning back to the first subscription, a transmission associated with the first subscription may be received, where the received transmission includes an absolute grant. Uplink data transmissions may then be sent while ignoring the received absolute grant.

Still further aspects of the present disclosure include processor-readable storage mediums storing processor-executable programming adapted to cause a processing circuit to communicate on a first subscription, and to tune away from the first subscription to a second subscription to perform a communication activity corresponding to the second subscription. The processor-executable programming may be further adapted to cause a processing circuit to tune back to the first subscription, and transmit uplink data while ignoring an absolute grant received after tuning back to the first subscription.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below with reference to one or more specific wireless communications protocols and systems, but those of ordinary skill in the art will recognize that one or more aspects of the present disclosure may be employed and included in one or more other wireless communication protocols and systems.

Figure 1:
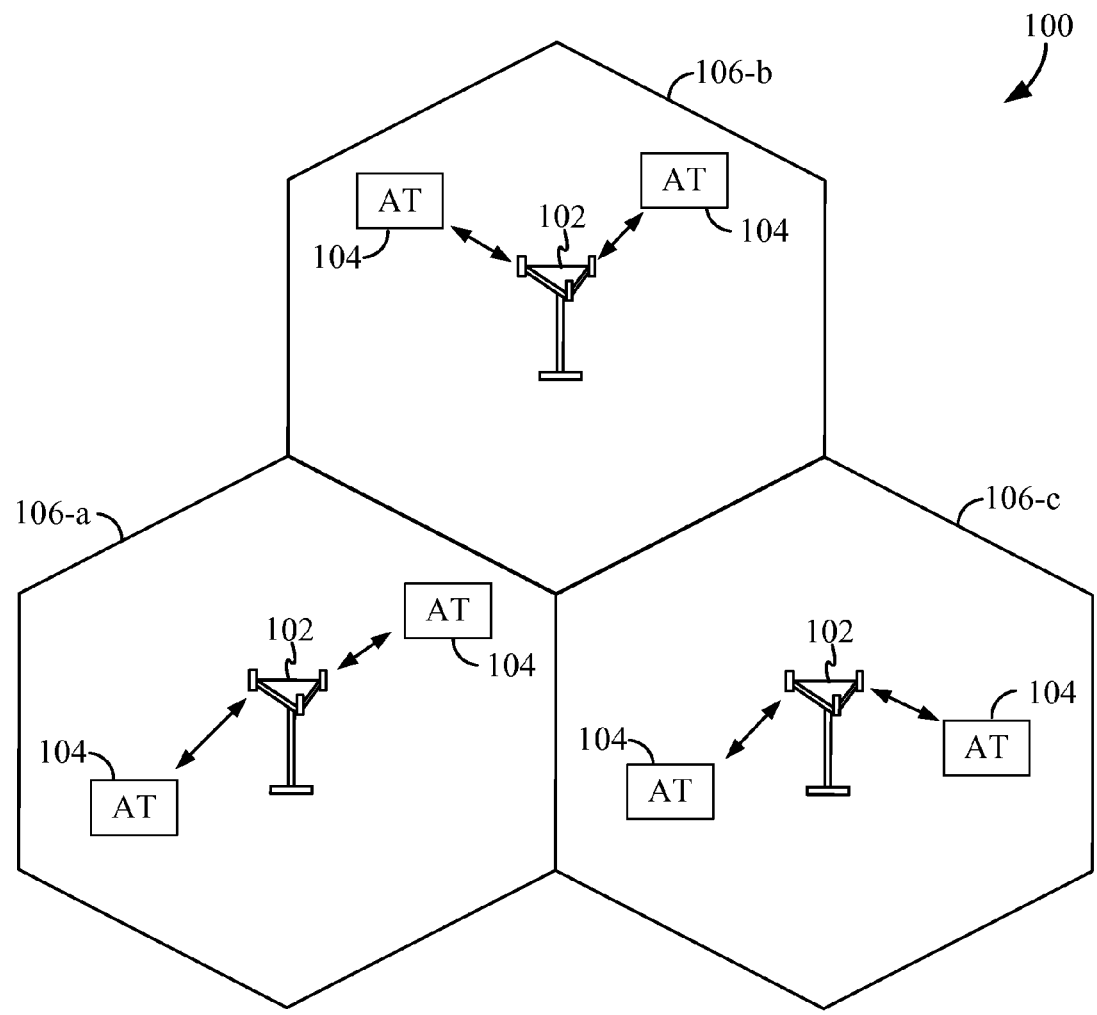
FIG. 1 is a block diagram conceptually illustrating an example of a telecommunications system according to some aspects of the disclosure.

Referring now to FIG. 1, a block diagram is shown illustrating an example of a network environment in which one or more aspects of the present disclosure may find application. The wireless communications system 100 is adapted to facilitate wireless communication between one or more base stations 102 and access terminals 104. The base stations 102 and access terminals 104 may be adapted to interact with one another through wireless signals. In some instances, such wireless interaction may occur on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. Such a base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

Figure 2:
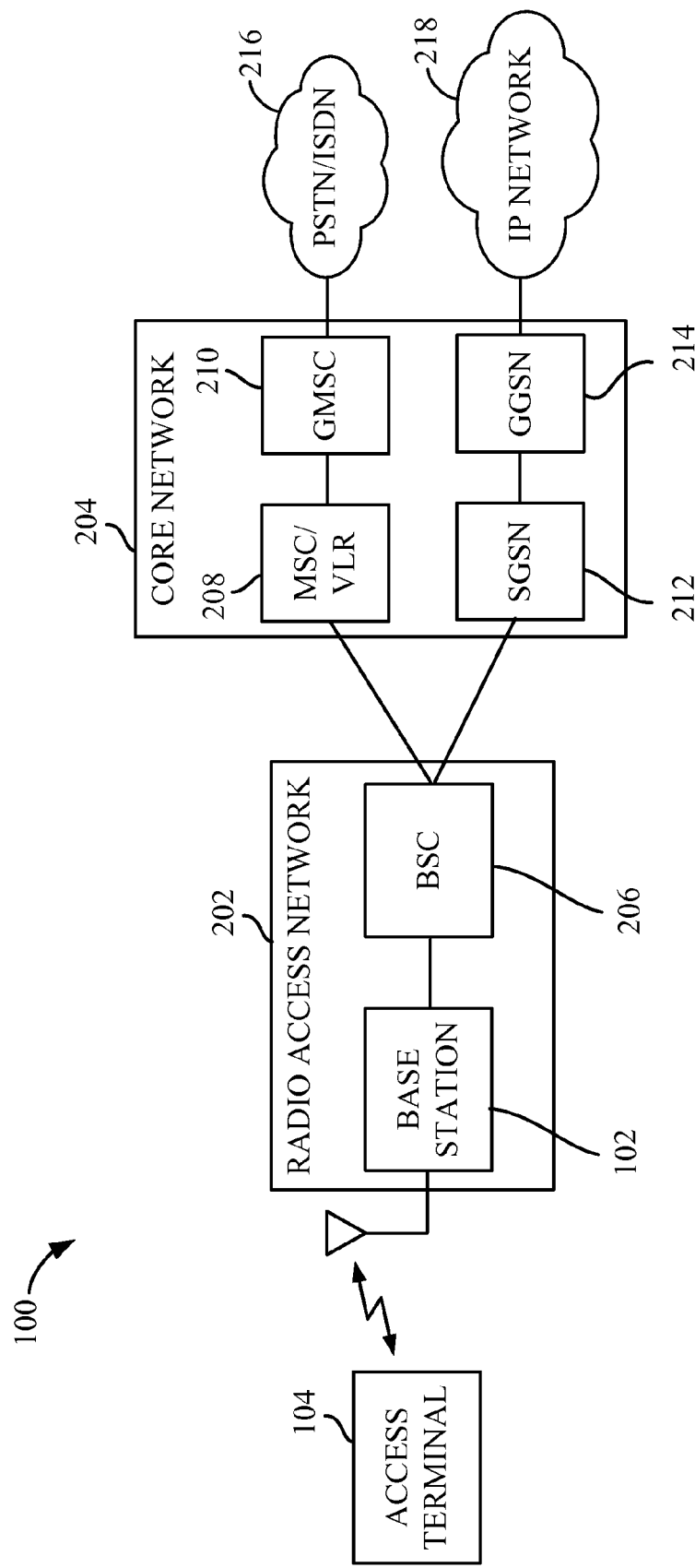
FIG. 2 is a conceptual diagram illustrating an example of an access network according to some aspects of the disclosure.

The base stations 102 are configured to communicate with the access terminals 104 under the control of a base station controller (see FIG. 2). Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). In various examples, the system 100 may include base stations 102 of different types.

One or more access terminals 104 may be dispersed throughout the coverage areas 110. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal. Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, sensor, sensing device, wearable device, router, and/or other communication/computing device which communicates, at least partially, through a wireless or cellular network.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as an EIR, a HLR, a VLR and/or a AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

Figure 3:
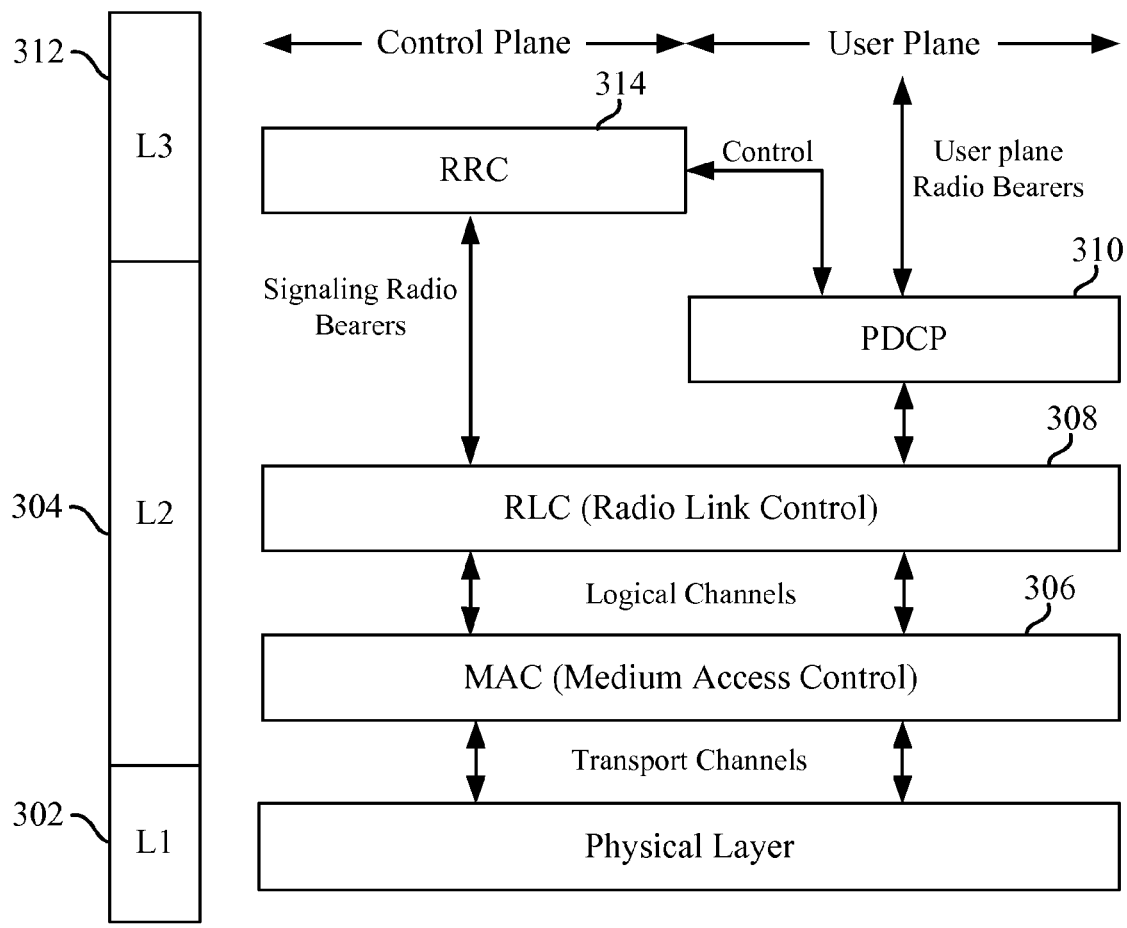
FIG. 3 is a conceptual diagram illustrating an example of a radio protocol architecture for the user and control plane.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 3 is a block diagram illustrating an example of a protocol stack architecture which may be implemented by an access terminal 104. In some examples, the signaling protocol stack is divided into a Non-Access Stratum (NAS) and an Access Stratum (AS). The NAS provides the upper layers, for signaling between the access terminal 104 and the core network 204 (see FIG. 2), and may include circuit switched and packet switched protocols. The AS provides the lower layers, for signaling between the RAN 202 and the access terminal 104, and may include a user plane and a control plane. Here, the user plane or data plane carries user traffic, while the control plane carries control information (i.e., signaling).

Referring to FIGS. 1 and 3, the protocol stack architecture for the access terminal 104 is shown to generally include three layers: Layer 1 (L1), Layer 2 (L2), and Layer 3 (L3). Layer 1 302 is the lowest layer and implements various physical layer signal processing functions. Layer 1 302 is also referred to herein as the physical layer 302. This physical layer 302 provides for the transmission and reception of radio signals between the access terminal 104 and a base station 102.

The data link layer, called Layer 2 (or "the L2 layer") 304, is above the physical layer 302 and is responsible for delivery of signaling messages generated by Layer 3. The L2 layer 304 makes use of the services provided by the physical layer 302. The L2 layer 304 may include multiple sublayers. For instance, the L2 layer 304 may include a Medium Access Control (MAC) sublayer 306 and a Radio Link Control (RLC) sublayer 308. In the user plane, the L2 layer 304 may further include a packet data convergence protocol (PDCP) sublayer 310.

The MAC sublayer 306 is the lower sublayer of the L2 layer 304. The MAC sublayer 306 implements the medium access protocol and is responsible for transport of higher layers' protocol data units using the services provided by the physical layer 302. The MAC sublayer 306 may manage the access of data from the higher layers to the shared air interface.

The RLC sublayer 308 provides segmentation and reassembly of upper layer data packets, retransmission of lost data packets, and reordering of data packets to compensate for out-of-order reception due to a hybrid automatic repeat request (HARQ).

The PDCP sublayer 310 provides multiplexing between different radio bearers and logical channels. The PDCP sublayer 310 also provides header compression for upper layer data packets to reduce radio transmission overhead, security by ciphering the data packets, and handover support for access terminals 104 between base stations 102.

Layer 3 312, which may also be referred to as the upper layer or the L3 layer, originates and terminates signaling messages according to the semantics and timing of the communication protocol between a base station 102 and the access terminal 104. The L3 layer 312 makes use of the services provided by the L2 layer. Information (both data and voice) message are also passed through the L3 layer 312.

The L3 layer 312 includes a radio resource control (RRC) sublayer 314 adapted to handle the control plane signaling between the access terminal 104 and the base station 102. RRC sublayer 314 includes a number of functional entities for routing higher layer messages, handling broadcasting and paging functions, establishing and configuring radio bearers, etc.

In some instances, an access terminal 104 may be configured to employ multiple subscriptions with a single transceiver. For example, an access terminal 104 may be configured for dual-SIM, dual standby (DSDS) operations and/or dual-SIM, dual-active (DSDA operations. Of course, dual SIMs is only one case, and aspects of the disclosure can be applied to a device with any number of SIMs. However, for ease of description, the present disclosure will refer to DSDx functionality to broadly refer to any such multi-subscription (multi-SIM) device with tune-away operations. Such an access terminal 104 can simultaneously or concurrently perform different communication activities corresponding to two or more different subscriptions, including but not limited to connecting with different networks, different subscriptions within the same network, multiple cells in a cellular network, or even, in some cases, to the same cell in the same network. For example a DSDx access terminal 104 may be enabled to continue to be engaged in ongoing communication activities on one subscription, while simultaneously performing other communication activities on another subscription, such as receiving paging messages, performing SMS messaging, or receiving other information on a different subscription or from a different cell.

Figure 4:
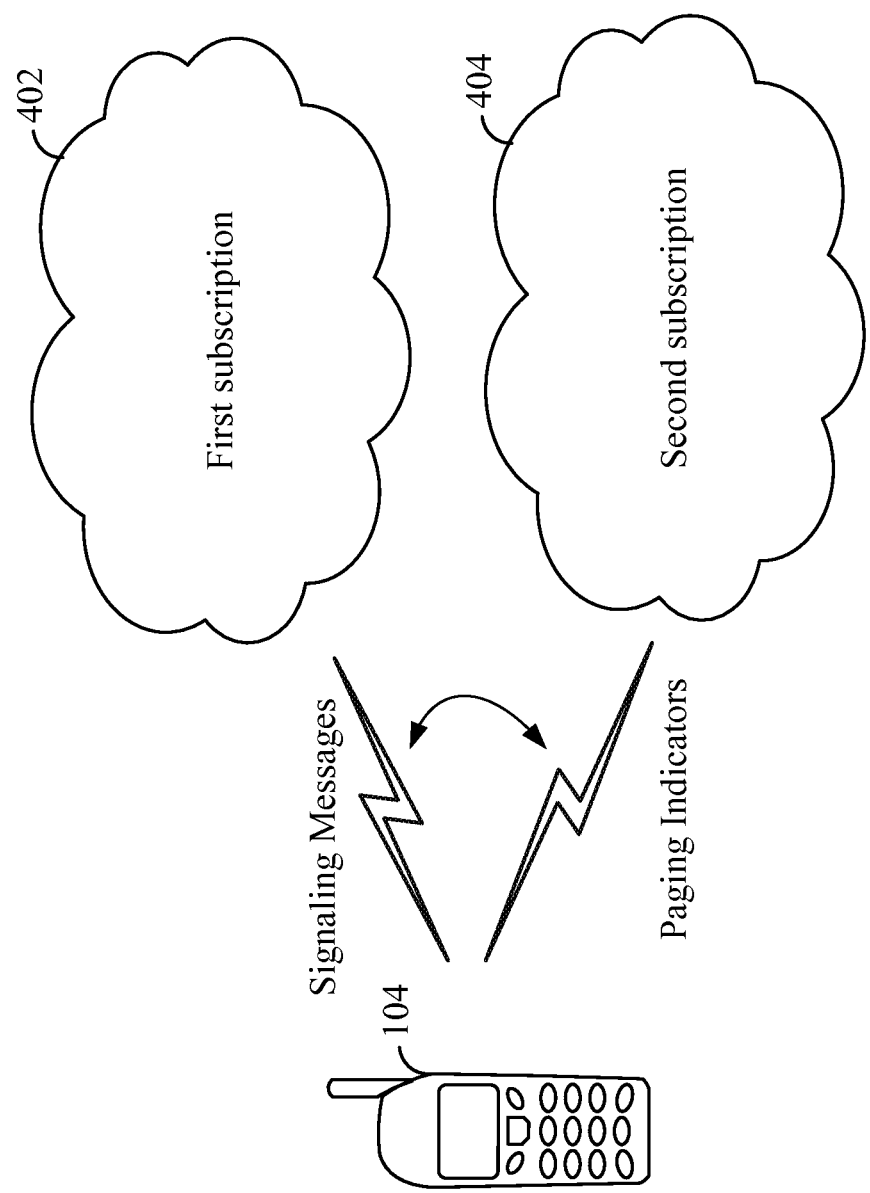
FIG. 4 is a conceptual diagram illustrating an access terminal configured to operate in a first subscription and a second subscription according to some aspects of the disclosure.

Referring to FIG. 4, an access terminal 104 with a single RF chain (e.g., transceiver) and DSDx capabilities may be active on a first subscription 402. While active on the first subscription 402, the access terminal 104 may need to tune the RF chain to a second subscription 404. For example, at certain occasions, the access terminal 104 may need to read the Paging Indicators (PIs) on a paging channel (PCH) to monitor for a Mobile Terminated (MT) call on the second subscription. Here, the secondary subscription 404 is merely illustrative in nature, and the access terminal 104 may be configured to communicate with any number of subscriptions. Thus, the term "second subscription" may refer to any subscription other than the first subscription 402. This process of tuning away from the current first subscription 402 for reading the paging information on the second subscription 404 is referred as DSDx tune-away. During the tune-away operation, the transceiver is tuned away from the first subscription 402 to the second subscription 404. As a result, there is typically be no communication on the first subscription 402 while the transceiver is tuned to the second subscription 404. Because the DSDx functionality is generally access terminal specific, and there are no standards-specific procedures or protocols for the tune-away operations, the network corresponding to the first subscription 402 typically has no knowledge of the transceiver state for the access terminal 104. For this reason, the network corresponding to the first subscription 402 may suddenly experiences no uplink transmissions from the access terminal 104, a loss of power control bits, etc.

In some instances, the sudden silence by the access terminal 104 can result in loss of resources allocated to the access terminal 104 by the network associated with the first subscription. For example, in high-speed uplink packet access (HSUPA) employed by UMTS networks, a grant to transmit uplink data is completely managed by the network, with close scrutiny on information requested by the access terminal. In general, the access terminal indicates its need for resources by transmitting a Scheduling Information (SI) message to the network. The Scheduling Information (SI) message is typically located at the end of the MAC-e or MAC-i protocol data unit (PDU), and is used to provide the serving base station (e.g., Node B) with a better view of the amount of system resources needed by the access terminal 104, and the amount of resources it can actually make use of.

Figure 5:
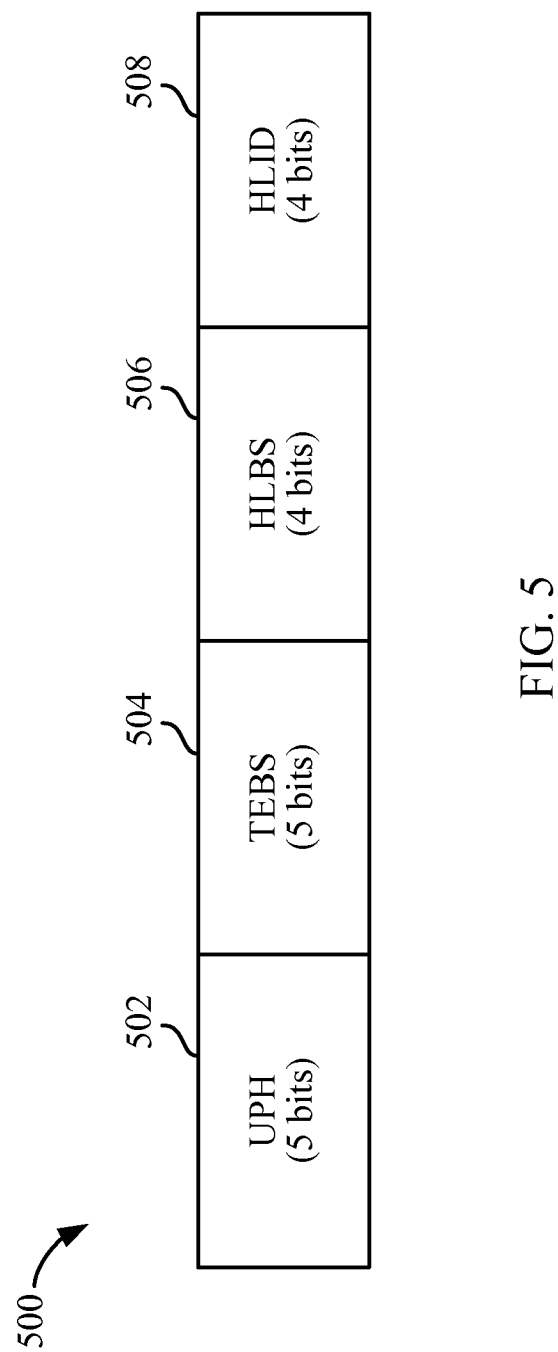
FIG. 5 is a block diagram illustrating an example of the format of an scheduling information message.

FIG. 5 is a block diagram illustrating an example of the format of a scheduling information (SI) message 500. As depicted, the scheduling information (SI) message may include a User Equipment (UE) power headroom (UPH) field 502, a total E-DCH buffer status (TEBS) field 504, a highest priority logical channel buffer status (HLBS) field 506, and a highest priority logical channel ID (HLID) field 508. When the scheduling information (SI) message is transmitted, its contents are updated in each new transmission with the buffer status after the application of an E-TFC selection procedure.

When the network receives a transmission including the scheduling information (SI) message from an access terminal, it indicates a scheduling grant to the access terminal based on the received information in the scheduling information (SI) message, as well as on any currently ongoing transmissions. For example, if the access terminal indicates high buffers, and is not transmitting anything, the network assumes that the access terminal is not able to utilize the resources efficiently. For this reason, the network may reduce the resources granted to the access terminal, as the resource is a common resource and can be effectively used by some other access terminal.

The timing and occasion of scheduling information (SI) transmissions by the access terminal are governed by the standards for UMTS (e.g., see 3GPP TS 25.321 v11.5.0 or earlier, section 11.8.1.6.*: Scheduling Information reporting, incorporated herein by reference). That is, the transmission of the scheduling information (SI) message is generally initiated due to the quantization of the transport block sizes that can be supported, or based on triggers defined in the standards for UMTS. Without receiving scheduling information (SI) messages from the access terminal, the network has no knowledge about the current state of the access terminal Thus, when the DSDx access terminal 104 performs tune-away operations from a first subscription on a UMTS network to communicate on a second subscription, the access terminal 104 halts its communication activity with the first subscription. The network assumes that the halt in communication activity indicates that the access terminal 104 has no data to send out. As a result, the network reduces the grant for the access terminal 104 to a minimal level to improve radio resource management. The network then signals this reduction of the grant to a minimal grant, or to a zero grant, by sending absolute grant information on the Absolute Grant Channel (AGCH).

Accordingly, even if the access terminal 104 is engaged in relatively large data transmission, such as an FTP transfer, the uplink resources granted to the access terminal 104 can be completely or partially lost after a tune-away. Further, since absolute grants are increased incrementally, in steps, the tune-away mechanism can badly affect the uplink throughput, and effectively degrade the user experience.

This issue can arise frequently in networks that include DSDx devices, wherein the network abruptly reduces the grant after the access terminal performs a tune-away, and only gradually increases the grant for the access terminal, in steps. If tune-aways are frequent enough, or if the increase in the grant is very slow, the access terminal might not be able to hold the peak grant for a long enough duration to complete the data transfer at all. Even if the data transfer is completed, though, the access terminal can suffer inferior uplink throughput performance.

According to at least one aspect of the disclosure, access terminals are adapted to facilitate tune-away operations in such a way as to mitigate the suffering of the uplink throughput, even when engaged in frequent tune-away operations. According to at least one example, access terminals of the present disclosure are adapted to ignore an absolute grant received from the network during a predefined period of time after tuning back to the first subscription. According to additional examples, access terminals of the present disclosure are adapted to transmit an SI message immediately (or after a predetermined interval) after exiting the tune-away to the second subscription (e.g., after tuning back to the first subscription). In yet further examples, access terminals of the present disclosure are adapted to both ignore absolute grants received during the predefined period of time after exiting the tune-away to the second subscription, and forcibly send the SI message after exiting the tune-away to the second subscription.

Figure 6:
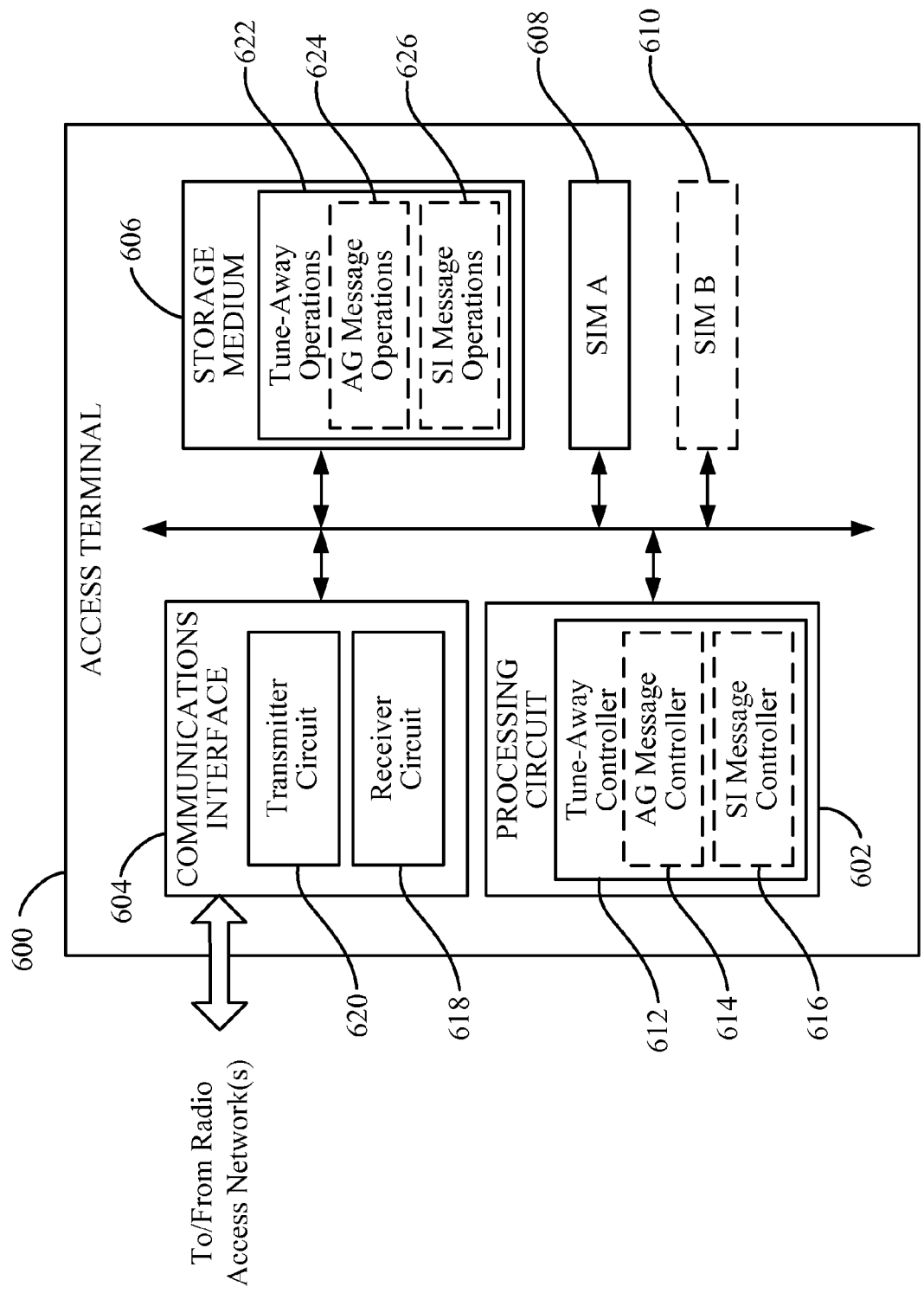
FIG. 6 is a block diagram illustrating select components of an access terminal according to at least one example.

Turning to FIG. 6, a block diagram is shown illustrating select components of an access terminal 600 according to at least one example of the present disclosure. The access terminal 600 includes a processing circuit 602 coupled to or placed in electrical communication with a communications interface 604 and a storage medium 606.

According to an aspect of the present disclosure, the access terminal 600 is adapted to employ multiple subscriptions. Accordingly, the access terminal 600 may include one or more subscription modules represented generally by SIM-A 608 and optional SIM-B 610. The subscription modules 608, 610 may also be referred to interchangeably herein as a subscriber identity module (SIM), although the one or more subscription modules may be one or more suitable subscription modules including, but not limited to, a Subscriber Identity Module (SIM), Removable User Identity Module (R-UIM), Universal Integrated Circuit Card (UICC), CDMA Subscriber Identity Module (CSIM), Universal Subscriber Identity Module (USIM)), etc. SIM-A 608 and SIM-B 610 may be associated with a different service subscription, different network access over the same or different network type, and/or use the same or different radio access technologies. In at least one example, the SIM-A 608 may be configured for a first subscription on a UMTS network, and (optionally) the SIM-B 610 may be configured for a second subscription on another network.

The processing circuit 602 is arranged to obtain, process and/or send data, control data access and storage, issue commands, and control other desired operations. The processing circuit 602 may include circuitry adapted to implement desired programming provided by appropriate media, and/or circuitry adapted to perform one or more functions described in this disclosure. For example, the processing circuit 602 may be implemented as one or more processors, one or more controllers, and/or other structure configured to execute executable programming Examples of the processing circuit 602 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 602 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 602 are for illustration and other suitable configurations within the scope of the present disclosure are also contemplated.

The processing circuit 602 is adapted for processing, including the execution of programming, which may be stored on the storage medium 606. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 602 may include a tune-away controller 612. The tune-away controller 612 may include circuitry and/or programming (e.g., programming stored on the storage medium 606) adapted to perform tune-away operations from the first subscription to the second subscription. In some embodiments, the tune-away controller includes an absolute grant (AG) message controller 614 and/or a scheduling information (SI) message controller 616. An absolute grant (AG) message controller 614 may include circuitry and/or programming (e.g., programming stored on the storage medium 606) adapted to ignore absolute grant messages received by the access terminal 600 during a defined period of time after exiting a tune-away to the second subscription. A scheduling information (SI) message controller 616 may include circuitry and/or programming (e.g., programming stored on the storage medium 606) adapted to transmit a scheduling information (SI) message immediately (or after a predetermined interval) after exiting the tune-away to the second subscription.

The communications interface 604 is configured to facilitate wireless communications of the access terminal 600. For example, the communications interface 604 may include circuitry and/or programming adapted to facilitate the communication of information bi-directionally with respect to one or more wireless network devices. The communications interface 604 may be coupled to one or more antennas (not shown), and includes wireless transceiver circuitry, including at least one receiver circuit 618 (e.g., one or more receiver chains) and/or at least one transmitter circuit 620 (e.g., one or more transmitter chains).

The storage medium 606 may represent one or more processor-readable devices for storing programming, such as processor executable code or instructions (e.g., software, firmware), electronic data, databases, or other digital information. The storage medium 606 may also be used for storing data that is manipulated by the processing circuit 602 when executing programming. The storage medium 606 may be any available media that can be accessed by a general purpose or special purpose processor, including portable or fixed storage devices, optical storage devices, and various other mediums capable of storing, containing and/or carrying programming By way of example and not limitation, the storage medium 606 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 606 may be coupled to the processing circuit 602 such that the processing circuit 602 can read information from, and write information to, the storage medium 606. That is, the storage medium 606 can be coupled to the processing circuit 602 so that the storage medium 606 is at least accessible by the processing circuit 602, including examples where the storage medium 606 is integral to the processing circuit 602 and/or examples where the storage medium 606 is separate from the processing circuit 602 (e.g., resident in the access terminal 600, external to the access terminal 600, distributed across multiple entities).

Programming stored by the storage medium 606, when executed by the processing circuit 602, causes the processing circuit 602 to perform one or more of the various functions and/or process steps described herein. In at least some examples, the storage medium 606 may include tune-away operations 622. The tune-away operations 622 are adapted to cause the processing circuit 602 to maintain network resources associated with the first subscription when performing tune-away operations to the second subscription, as described herein. In some embodiments, the tune-away operations 622 may include absolute grant (AG) message operations 624 and/or scheduling information (SI) message operations 626.

Thus, according to one or more aspects of the present disclosure, the processing circuit 602 is adapted to perform (in conjunction with the storage medium 606) any or all of the processes, functions, steps and/or routines for any or all of the access terminals described herein (e.g., access terminal 104, access terminal 600). As used herein, the term "adapted" in relation to the processing circuit 602 may refer to the processing circuit 602 being one or more of configured, employed, implemented, and/or programmed (in conjunction with the storage medium 606) to perform a particular process, function, step and/or routine according to various features described herein.

Figure 7:
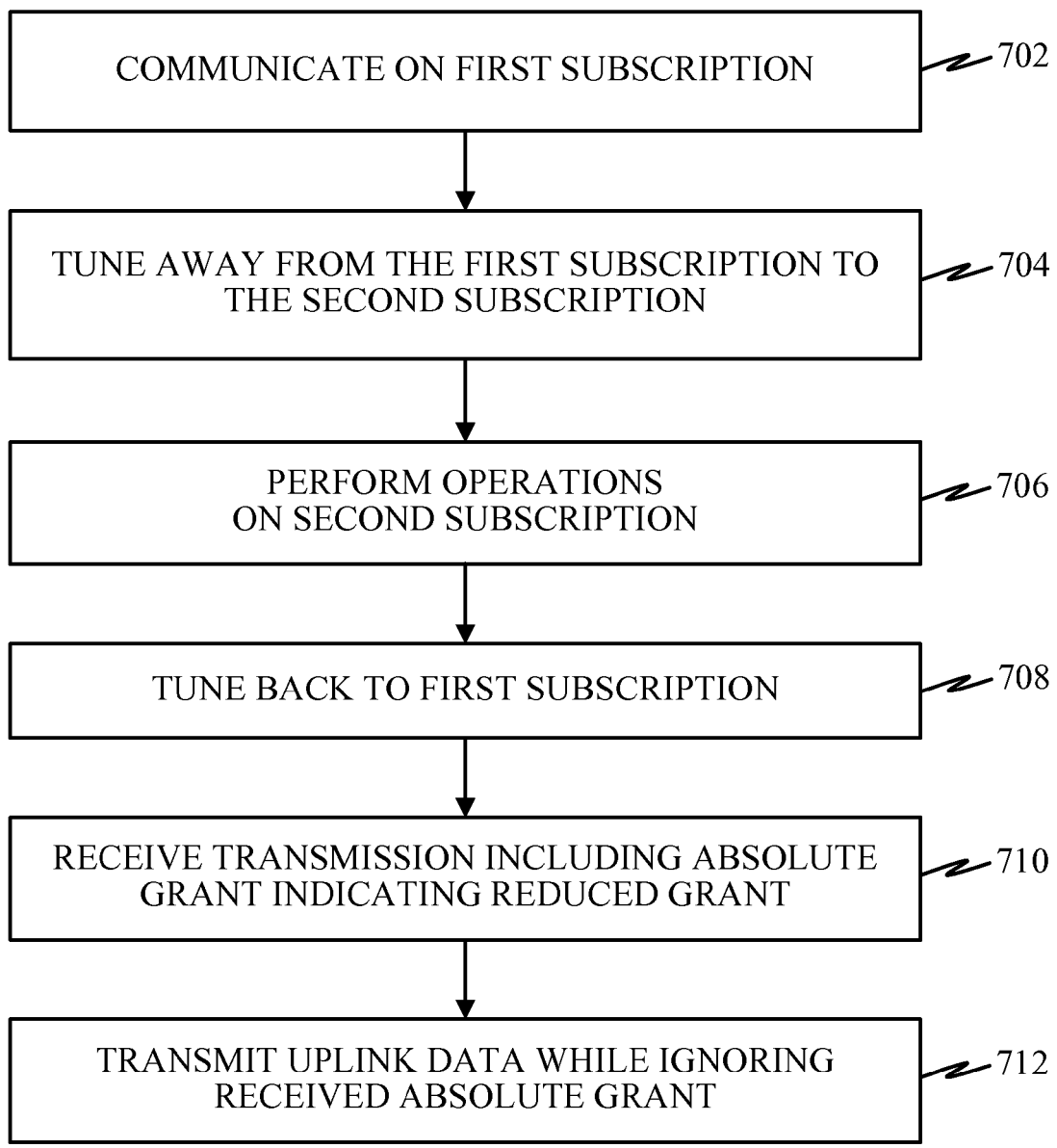
FIG. 7 is a flow diagram illustrating a method operational on an access terminal according to at least one example.

FIG. 7 is a flow diagram illustrating at least one example of a method operational on an access terminal, such as the access terminal 600. Referring to FIGS. 6 and 7, an access terminal 600 can communicate on a first subscription, at block 702. For example, the processing circuit 602 may communicate via the communications interface 604 with a network associated with a first subscription corresponding to SIM A 608. In at least one example, the network associated with the first subscription is a UMTS network.

During such communications, the access terminal 600 may tune away from the first subscription to a second subscription, at block 704. For example, the processing circuit 602 (e.g., the tune-away controller 612) executing the tune-away operations 622 can tune the communications interface 604 away from the first subscription corresponding to SIM A 608 to a second subscription (e.g. a subscription corresponding to SIM B 610). That is, the processing circuit 602 (e.g., the tune-away controller 612) can configure the transmitter circuit 620 and/or the receiver circuit 618 to enable communications according to the various requirements (e.g., frequency, formatting, modulation, etc.) associated with the second subscription (e.g., SIM B 610).

At block 706, the access terminal 600 can perform communication operations on the second subscription. For instance, the processing circuit 602 may send and/or receive wireless communications via the communications interface 604 on the second subscription for any amount of time. In some examples, the processing circuit 602 may receive and decode via the receiver circuit 618 a mobile terminated page message.

At block 708, the access terminal 600 tunes back to the first subscription. For example, the processing circuit 602 (e.g., the tune-away controller 612) executing the tune-away operations 622 can tune the communications interface 604 back to the first subscription corresponding to SIM A 608. That is, the processing circuit 602 (e.g., the tune-away controller 612) can re-configure the transmitter circuit 620 and/or the receiver circuit 618 to enable communications according to the various requirements (e.g., frequency, formatting, modulation, etc.) associated with the first subscription (e.g., SIM A 608).

During the time while the access terminal 600 was tuned to the second subscription, it is possible that the network associated with the first subscription may have reduced the grant to the access terminal 600, as a result of a lack of communication activity between the access terminal 600 and the network associated with the first subscription during the tune-away duration. Accordingly, as indicated at block 710, the access terminal 600 may receive a transmission including an absolute grant (AG) indicating a reduced grant. For example, the processing circuit 602 may receive and decode a transmission on the first subscription via the communications interface 604, where the received transmission includes an absolute grant (AG). Such an absolute grant (AG) may include control information to control an enhanced uplink (EUL), as described above. In some examples, the received absolute grant (AG) may indicate a minimal grant or a zero grant resulting from the tune-away operations and corresponding pause in SI message transmissions from the access terminal 600.

At block 712, the access terminal 600 may transmit uplink data while ignoring the received absolute grant (AG). For example, the processing circuit 602 (e.g., the AG message controller 614) executing the AG message operations 624 may ignore the received absolute grant (AG) and transmit uplink data on the first subscription via the communications interface as if the absolute grant (AG) were never received. That is, the access terminal 600 is adapted to ignore the parameters specified by the received absolute grant as if it were never received. According to the existing standards for UMTS, an access terminal is allowed to continue sending data on the uplink if a transmitted absolute grant (AG) was missed or not successfully received by the access terminal, even though the absolute grant (AG) may have indicated a zero grant. At block 712, the access terminal 600 is adapted to take advantage of this allowance, except that the access terminal 600 ignores an absolute grant (AG) that has been successfully received.

In some implementations, the AG message operations 624 may be configured to cause the processing circuit 602 (e.g., the AG message controller 614) to only ignore an absolute grant (AG) received within a predefined time period after tuning back to the first subscription.

In some implementations, the processing circuit 602 (e.g., the AG message controller 614) executing the AG message operations 624 may continue to utilize a grant received prior to the tune-away operation for transmitting uplink data. In other implementations, the processing circuit 602 (e.g., the AG message controller 614) executing the AG message operations 624 may transmit the uplink data including any suitable quantity of data.

According to at least one example, the AG message operations 624 may be adapted to cause the processing circuit 602 (e.g., the AG message controller 614) to ignore the absolute grant (AG) information for a finite time, corresponding to a predetermined interval T. In other examples, the AG message operations 624 may be adapted to cause the processing circuit 602 (e.g., the AG message controller 614) to ignore the absolute grant (AG) information for a predetermined number of successful scheduling information (SI) message transmissions. In such implementations, by giving the opportunity for the network to receive scheduling information (SI) message transmissions from the access terminal 600, the network can incrementally (by steps) increase the absolute grant for the access terminal 600 during the time that the access terminal 600 ignores the absolute grant (AG) information. In this way, the access terminal 600 may continue transmitting its uplink data in spite of any possible reduced absolute grant (AG) that may follow the tune-away.

Figure 8:
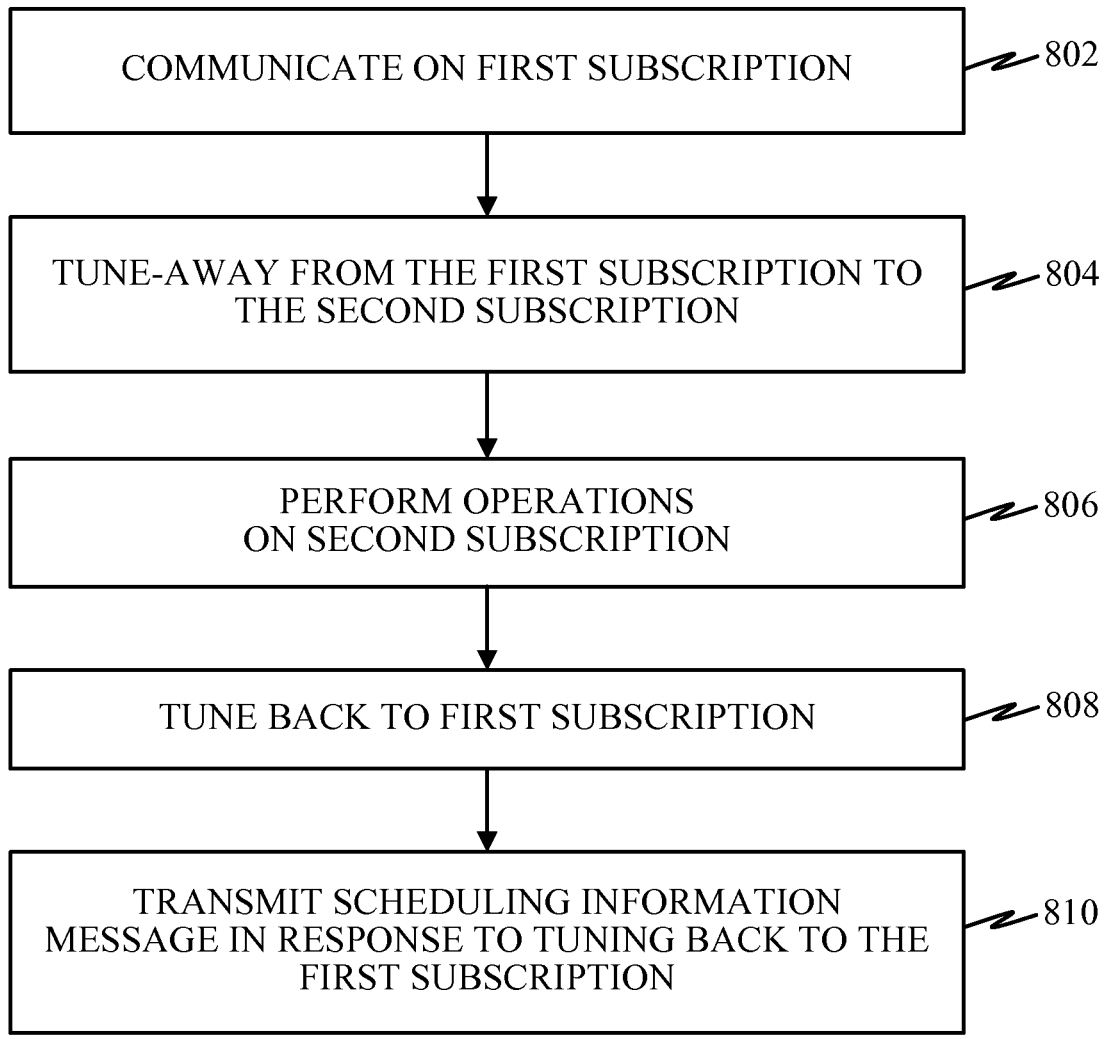
FIG. 8 is a flow diagram illustrating another method operational on an access terminal according to at least one example.

FIG. 8 is a flow diagram illustrating at least one example of a method operational on an access terminal, such as the access terminal 600. Referring to FIGS. 6 and 8, an access terminal 600 can communicate on a first subscription, at block 802. For example, the processing circuit 602 may communicate via the communications interface 604 with a network associated with a first subscription corresponding to SIM A 608. In at least one example, the network associated with the first subscription is a UMTS network.

During such communications, the access terminal 600 may tune away from the first subscription to a second subscription, at block 804. For example, the processing circuit 602 (e.g., the tune-away controller 612) executing the tune-away operations 622 can tune the communications interface 604 away from the first subscription corresponding to SIM A 608 to a second subscription (e.g. a subscription corresponding to SIM B 610). That is, the processing circuit 602 (e.g., the tune-away controller 612) can configure the transmitter circuit 620 and/or the receiver circuit 618 to enable communications according to the various requirements (e.g., frequency, formatting, modulation, etc.) associated with the second subscription (e.g., SIM B 610).

At block 806, the access terminal 600 can perform communication operations on the second subscription. For instance, the processing circuit 602 may send and/or receive wireless communications via the communications interface 604 on the second subscription for any amount of time. In some examples, the processing circuit 602 may receive and decode via the receiver circuit 618 a mobile terminated page message.

At block 808, the access terminal 600 tunes back to the first subscription. For example, the processing circuit 602 (e.g., the tune-away controller 612) executing the tune-away operations 622 can tune the communications interface 604 back to the first subscription corresponding to SIM A 608. That is, the processing circuit 602 (e.g., the tune-away controller 612) can re-configure the transmitter circuit 620 and/or the receiver circuit 618 to enable communications according to the various requirements (e.g., frequency, formatting, modulation, etc.) associated with the first subscription (e.g., SIM A 608).

At block 810, the access terminal 600 may transmit a scheduling information (SI) message in response to tuning back to the first subscription. For example, the processing circuit 602 (e.g., the SI message controller 616) executing the SI message operations 626 may generate and transmit a scheduling information (SI) message via the communications interface 604 to the network in response to tuning back to the first subscription. As described above, the network generally provides instructions to the access terminal 600 as to when, and how often, to transmit the scheduling information (SI) messages. However, according to an aspect of the present disclosure, the processing circuit 602 (e.g., the SI message controller 616) executing the SI message operations 626 can transmit the scheduling information (SI) message in response to tuning back to the first subscription following a tune-away operation instead of (and likely contrary to) following the network-specified schedule. Thus, this scheduling information (SI) message can be sent in addition to the scheduled transmissions of the scheduling information (SI) message. By sending an additional scheduling information (SI) message, the access terminal 600 can enable the network to have better, more updated information regarding the state of the access terminal's 600 uplink buffer, as well as other parameters corresponding to the uplink.

In some examples, the SI message operations 626 may cause the processing circuit 602 (e.g., the SI message controller 616) to transmit the scheduling information (SI) message via the communications interface 604 immediately after exiting the tune-away to the second subscription. In other examples, the SI message operations 626 may cause the processing circuit 602 (e.g., the SI message controller 616) to transmit the scheduling information (SI) message via the communications interface 604 after a predetermined interval after exiting the tune-away to the second subscription.

These two broad aspects (i.e., ignoring the absolute grant after exiting a tune-away procedure, and sending the scheduling information (SI) message in response to exiting the tune-away procedure) may be implemented on their own, or concurrently, as desired. By implementing one or both of these algorithms, the network can become informed of the latest buffer status in uplink for the access terminal, and can fine tune the grant to the access terminal more quickly. Further, by ignoring the absolute grant, the access terminal can transmit uplink data even in the face of minimal grants or a zero grant, while giving the network time to incrementally increase the absolute grant to the access terminal a number of times to a more suitable value.

While the above discussed aspects, arrangements, and embodiments are discussed with specific details and particularity, one or more of the components, steps, features and/or functions illustrated in FIGS. 1, 2, 3, 4, 5, 6, 7, and/or 8 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 4, and/or 6 may be configured to perform or employ one or more of the methods, features, parameters, and/or steps described in FIGS. 3, 5, 7, and/or 8. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
   a communications interface;
   a plurality of subscription modules, including a first subscription module associated with a first subscription, and a second subscription module associated with a second subscription; and
   a processing circuit coupled to the communications interface and the plurality of subscription modules, the processing circuit adapted to:
      communicate on the first subscription via the communications interface;
      tune the communications interface away from the first subscription to the second subscription for performing a communication activity corresponding to the second subscription;
      tune the communications interface back to the first subscription;
      receive a transmission associated with the first subscription via the communications interface after tuning back to the first subscription, wherein the transmission includes an absolute grant; and
      transmit uplink data via the communications interface while ignoring the received absolute grant.

2. The access terminal of claim 1, wherein the processing circuit is further adapted to:
   transmit a scheduling information message via the communications interface in response to tuning the communications interface back to the first subscription.

3. The access terminal of claim 1, wherein the processing circuit is further adapted to:
   continue ignoring the received absolute grant for a predetermined duration of time.

4. The access terminal of claim 1, wherein the processing circuit is further adapted to:
   continue ignoring the received absolute grant until a predetermined number of scheduling information messages have been transmitted via the communications interface.

5. The access terminal of claim 1, wherein the processing circuit adapted to transmit uplink data via the communications interface while ignoring the received absolute grant comprises the processing circuit adapted to:
   transmit the uplink data via the communications interface according to a grant received prior to tuning the communications interface away from the first subscription to the second subscription.

6. The access terminal of claim 1, wherein the processing circuit adapted to transmit uplink data via the communications interface while ignoring the received absolute grant comprises the processing circuit adapted to:
   transmit the uplink data via the communications interface in any quantity determined to be suitable.

7. The access terminal of claim 1, wherein the absolute grant comprises control information to control an enhanced uplink (EUL).

8. A method operational on an access terminal capable of communicating with at least a first subscription and a second subscription, comprising:
   communicating on the first subscription;
   tuning away from the first subscription to the second subscription to perform a communication activity corresponding to the second subscription;
   tuning back to the first subscription;
   receiving a transmission associated with the first subscription after tuning back to the first subscription, wherein the transmission includes an absolute grant; and
   transmitting uplink data while ignoring the received absolute grant.

9. The method of claim 8, further comprising:
   transmitting a scheduling information message in response to tuning back to the first subscription.

10. The method of claim 8, wherein transmitting uplink data while ignoring the received absolute grant comprises:
    transmitting the uplink data according to a grant received prior to tuning away from the first subscription to the second subscription.

11. The method of claim 8, wherein transmitting uplink data while ignoring the received absolute grant comprises:
    transmitting the uplink data in any quantity determined by the access terminal to be suitable.

12. The method of claim 8, further comprising:
    continuing to ignore the received absolute grant for a predetermined duration of time.

13. The method of claim 8, further comprising:
    continuing to ignore the received absolute grant until a predetermined number of scheduling information messages have been transmitted by the access terminal.

14. The method of claim 8, wherein receiving the transmission associated with the first subscription after tuning back to the first subscription, wherein the transmission includes an absolute grant comprises:
    receiving the transmission associated with the first subscription after tuning back to the first subscription, wherein the transmission includes an absolute grant comprising control information to control an enhanced uplink (EUL).

15. An access terminal capable of communicating with at least a first subscription and a second subscription, comprising:
    means for communicating on the first subscription;
    means for tuning away from the first subscription to the second subscription to perform a communication activity corresponding to the second subscription;
    means for tuning back to the first subscription;
    means for receiving a transmission associated with the first subscription after tuning back to the first subscription, wherein the transmission includes an absolute grant; and
    means for transmitting uplink data while ignoring the received absolute grant.

16. The access terminal of claim 15, further comprising:
    means for transmitting a scheduling information message in response to tuning back to the first subscription.

17. The access terminal of claim 15, wherein transmitting uplink data while ignoring the received absolute grant comprises:
    transmitting the uplink data according to a grant received prior to tuning away from the first subscription to the second subscription.

18. The access terminal of claim 15, wherein transmitting uplink data while ignoring the received absolute grant comprises:
    transmitting the uplink data in any quantity determined by the access terminal to be suitable.

19. The access terminal of claim 15, further comprising:
    means for continuing to ignore the received absolute grant for a predetermined duration of time.

20. The access terminal of claim 15, further comprising:
    means for continuing to ignore the received absolute grant until a predetermined number of scheduling information messages have been transmitted by the access terminal.

21. A non-transitory processor-readable storage medium storing processor-executable programming for causing a processing circuit to:
    communicate on a first subscription;
    tune away from the first subscription to a second subscription to perform a communication activity corresponding to the second subscription;
    tune back to the first subscription; and
    transmit uplink data while ignoring an absolute grant received after tuning back to the first subscription.

22. The processor-readable storage medium of claim 21, further comprising processor-executable programming for causing a processing circuit to:
    transmit a scheduling information message in response to tuning back to the first subscription.

23. The processor-readable storage medium of claim 21, further comprising processor-executable programming for causing a processing circuit to:
    continue ignoring the received absolute grant for a predetermined duration of time.

24. The processor-readable storage medium of claim 21, further comprising processor-executable programming for causing a processing circuit to:
    continue ignoring the received absolute grant until a predetermined number of scheduling information messages have been transmitted.

25. The processor-readable storage medium of claim 21, wherein the processor-executable programming for causing a processing circuit to transmit uplink data while ignoring the received absolute grant comprises processor-executable programming for causing a processing circuit to:
    transmit the uplink data according to a grant received prior to tuning the communications interface away from the first subscription to the second subscription.

26. The processor-readable storage medium of claim 21, wherein the processor-executable programming for causing a processing circuit to transmit uplink data while ignoring the received absolute grant comprises processor-executable programming for causing a processing circuit to:
    transmit the uplink data in any quantity determined to be suitable.

\* \* \* \* \*